Patented Dec. 15, 1931

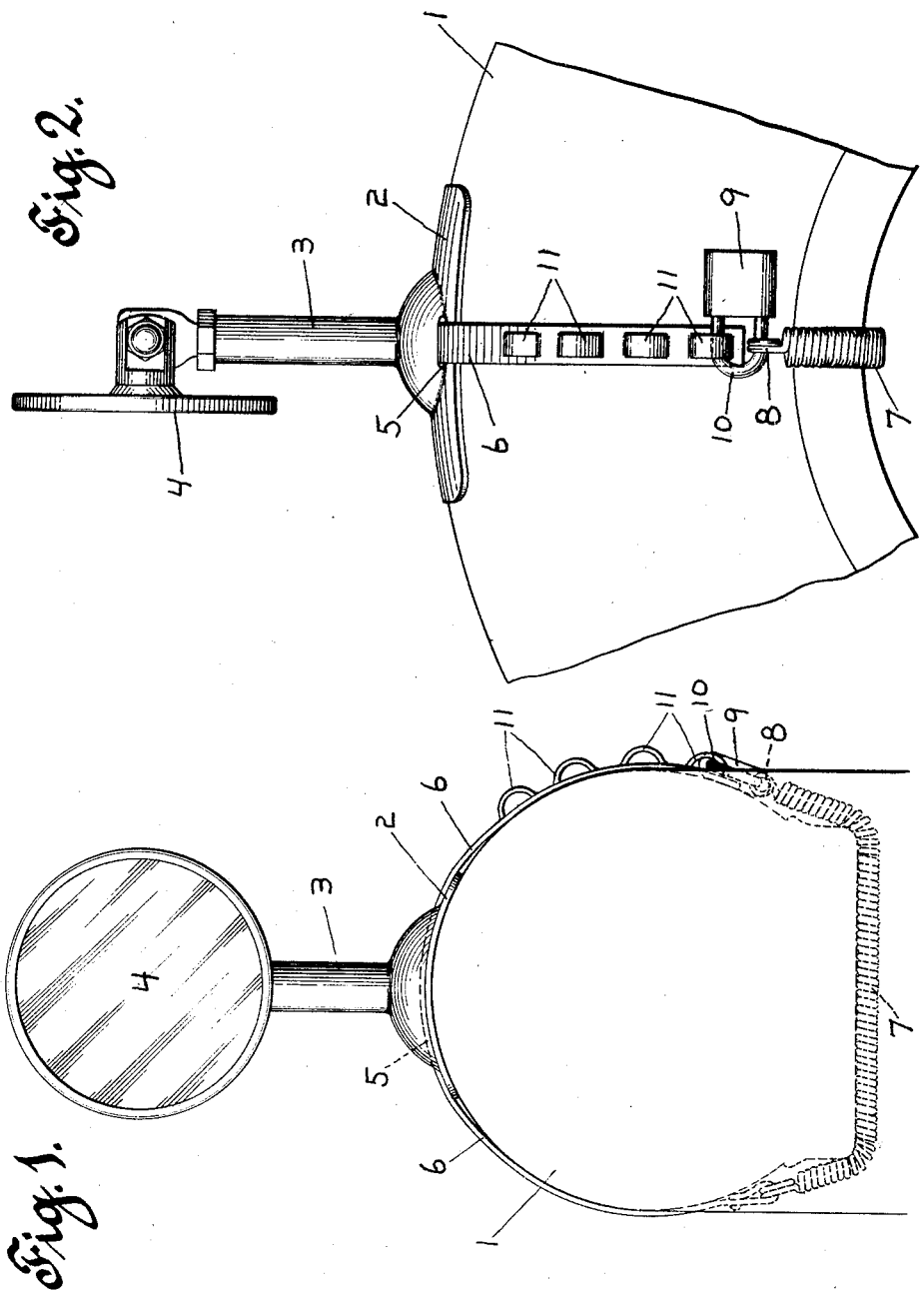

1,836,878

UNITED STATES PATENT OFFICE

PETER SAUER, OF FAIRFIELD, CONNECTICUT, ASSIGNOR TO THE KILBORN-SAUER COMPANY, OF FAIRFIELD, CONNECTICUT, A CORPORATION OF CONNECTICUT

REAR-VIEW MIRROR

Application filed June 27, 1930. Serial No. 464,155.

My invention relates to improvements in so-called rear-view mirrors for attachment on a spare tire carried at the side of an automobile, so that the driver may easily see the mirror and the objects reflected thereby.

In view of the great vibration to which such mirrors are subjected it is important that there be no loose parts to rattle. It is also important that the mirror shall be securely held so that it will not be displaced. It is also important that the mirror support shall be adaptable to fit a wide range of tire sizes.

By my improvements all of these advantages and others are attained, as will be seen by any one versed in this art, on reading the following specification and on an examination of the accompanying drawings, in which—

Fig. 1 is a rear view of the invention in its operative position;

Fig. 2 is a side elevation of the invention in its operative position.

1 conventionally represents an automobile tire upon which the rear vision mirror is mounted. 2 represents a saddle, shaped to approximately fit the outer top surface of the tire and to furnish a broad bearing thereon. 3 is a standard supporting a rear vision mirror 4. The saddle 2 has a transverse passage 5 through which is passed the metal strap 6. 7 is an elastic connector, preferably in the form of a coil spring, which is hitched at one end to one end of the strap 6 and which has an eye 8 at its other end. 9 is a padlock, the hasp 10 of which serves as a link to connect the eye 8 and the strap 6 when the device is in operative position.

Means are provided so that the eye end of the elastic connector 7 can be connected to the strap 6 at any one of several spaced apart points on the strap so as to adapt the device to fit a wide range of tire sizes. In the preferred form shown in the drawings the strap 6 has a plurality of integral loops 11 projecting from one side thereof. These loops are spaced longitudinally of the strap and are preferably positioned near one end thereof.

The spring 7 is put under suitable tension in the act of catching the padlock 9 on one of the loops 11 so that it securely and yet elastically holds the mirror on the upper surface of the spare tire.

When the parts are assembled it will be apparent that there will be no loose parts to rattle and jangle, and at the same time the device is adapted to fit a wide range of tire sizes. Furthermore, it will be apparent that there will be no extreme pressure applied by any of the parts surrounding the tire or the wheel rim on which the support is mounted to cut into or otherwise injure the surfaces of the tire or rim. Again, by this construction all the parts lie snugly against the side of the tire and hence do not stand out or away therefrom or catch the clothing of a passerby, nor are they otherwise objectionable. The padlock provides a safeguard against theft.

What I claim is:

1. As an article of manufacture, a spare-tire bracket to be mounted on a spare tire, said bracket comprising a standard and means to secure said standard to a spare tire, said means comprising a metal strap coacting with said standard and having a plurality of integral loops spaced longitudinally of said strap and positioned near one end thereof and projecting from one side thereof, a spiral spring connected at one end to the other end of said strap, said spiral spring having an eye at the opposite end thereof, and a padlock having a hasp adapted to pass through one of said loops and said eye, said padlock being the sole means for connecting the free end of said spiral spring to one of said loops.

2. Means for supporting a rear-view mirror upon a tire, said means comprising a saddle having a transverse strap passage therein, a metal strap passing through said passage and having a plurality of integral loops projecting from one side thereof at one side of said saddle, a spiral spring connected at one end to one end of said strap at the other side of said saddle, and a padlock having a hasp for connecting the free end of said spiral spring to one of said loops, said padlock being the sole means for connecting the free end of said spiral spring to one of said loops.

PETER SAUER.